US011731659B2

(12) United States Patent
Hukkeri et al.

(10) Patent No.: US 11,731,659 B2
(45) Date of Patent: Aug. 22, 2023

(54) DETERMINATION OF VEHICLE PULLOVER LOCATION CONSIDERING AMBIENT CONDITIONS

(71) Applicant: Argo AI, LLC, Pittsburgh, PA (US)

(72) Inventors: Ramadev Burigsay Hukkeri, Pittsburgh, PA (US); Jay Sidhu, Federal Way, WA (US)

(73) Assignee: ARGO AI, LLC, Pittsburgh, PA (US)

( * ) Notice: Subject to any disclaimer, the term of this patent is extended or adjusted under 35 U.S.C. 154(b) by 0 days.

(21) Appl. No.: 17/244,473

(22) Filed: Apr. 29, 2021

(65) Prior Publication Data

US 2022/0348233 A1 Nov. 3, 2022

(51) Int. Cl.
*B60W 60/00* (2020.01)
*G06V 20/58* (2022.01)
*B60W 30/18* (2012.01)
*B60W 40/04* (2006.01)

(52) U.S. Cl.
CPC .... *B60W 60/00253* (2020.02); *B60W 30/181* (2013.01); *B60W 40/04* (2013.01); *G06V 20/58* (2022.01); *B60W 2552/10* (2020.02); *B60W 2554/406* (2020.02); *B60W 2555/60* (2020.02); *B60W 2556/40* (2020.02)

(58) Field of Classification Search
CPC ......... B60W 60/00253; B60W 30/181; B60W 40/04; B60W 2556/40; B60W 2555/60; B60W 2554/406; B60W 2552/10; G06V 20/58
USPC .......................................................... 701/25
See application file for complete search history.

(56) References Cited

U.S. PATENT DOCUMENTS

| 9,733,096 | B2 | 8/2017 | Colijn et al. |
| 10,261,512 | B1 * | 4/2019 | Cullinane ......... B60W 60/0025 |
| 10,401,858 | B2 | 9/2019 | Pandit et al. |
| 10,769,452 | B2 | 9/2020 | Rasmusson, Jr. et al. |
| 2009/0069994 | A1 * | 3/2009 | Uechi ................... B60W 40/08 701/70 |
| 2017/0138751 | A1 * | 5/2017 | Martyniv ............... G06Q 50/30 |
| 2018/0107222 | A1 | 4/2018 | Fairfield et al. |
| 2018/0113456 | A1 | 4/2018 | Iagnemma et al. |

(Continued)

OTHER PUBLICATIONS

Information about Related Patents and Patent Applications, see section 4 of the accompanying Information Disclosure Statement Letter, which concerns Related Patents and Patent Applications.

(Continued)

*Primary Examiner* — Tyler D Paige
(74) *Attorney, Agent, or Firm* — Fox Rothschild LLP

(57) ABSTRACT

This document describes methods and systems for enabling an autonomous vehicle (AV) to determine a path to a stopping location. The AV will determine a desired stop location (DSL) that is associated with a service request. The AV's motion control system will move the AV along a path to the DSL. While moving along the path, the AV's perception system will detect ambient conditions near the DSL. The ambient conditions will be parameters associated with a stopping rule. The AV will apply the stopping rule to the ambient conditions to determine whether the stopping rule permits the AV to stop at the DSL. If the stopping rule permits the AV to stop at the DSL, the motion control system will move the AV to, and stop at, the DSL. Otherwise, the motion control system will not stop the AV at the DSL.

24 Claims, 10 Drawing Sheets

(56) References Cited

U.S. PATENT DOCUMENTS

| | | | |
|---|---|---|---|
| 2018/0136656 A1 | 5/2018 | Rasmusson, Jr. et al. | |
| 2018/0143641 A1 | 5/2018 | Rao | |
| 2018/0328748 A1 | 11/2018 | Chachra et al. | |
| 2018/0329418 A1* | 11/2018 | Baalke | G06Q 50/28 |
| 2019/0066515 A1 | 2/2019 | Dyer et al. | |
| 2019/0187702 A1 | 6/2019 | Herbach et al. | |
| 2019/0193733 A1 | 6/2019 | Russell et al. | |
| 2019/0228375 A1 | 7/2019 | Laury et al. | |
| 2019/0369621 A1 | 12/2019 | Pandit et al. | |
| 2020/0117926 A1* | 4/2020 | Kim | G08G 1/141 |
| 2020/0148196 A1 | 5/2020 | Lim | |
| 2020/0158523 A1 | 5/2020 | Kline et al. | |
| 2020/0160709 A1* | 5/2020 | Ramot | B60W 60/00253 |
| 2020/0166935 A1 | 5/2020 | Herbach et al. | |
| 2020/0192382 A1 | 6/2020 | Pandit et al. | |
| 2020/0192385 A1 | 6/2020 | Fairfield et al. | |
| 2020/0240798 A1 | 7/2020 | Gao et al. | |
| 2020/0240799 A1 | 7/2020 | Gao et al. | |
| 2020/0310461 A1 | 10/2020 | Kaufman et al. | |
| 2020/0346662 A1* | 11/2020 | Suzuki | B60W 60/00276 |
| 2020/0363805 A1 | 11/2020 | Arden et al. | |
| 2021/0053567 A1* | 2/2021 | Dyer | G05D 1/0088 |
| 2021/0089788 A1* | 3/2021 | Engle | G08G 1/0137 |
| 2021/0096565 A1 | 4/2021 | Xie et al. | |
| 2021/0107476 A1* | 4/2021 | Cui | B60W 60/00276 |
| 2021/0114617 A1 | 4/2021 | Phillips et al. | |
| 2021/0133466 A1* | 5/2021 | Gier | G05D 1/0223 |
| 2022/0073070 A1* | 3/2022 | Niewiadomski | B60W 40/12 |
| 2022/0073099 A1* | 3/2022 | Park | B60W 60/00253 |
| 2022/0136847 A1 | 5/2022 | Higuchi et al. | |
| 2022/0221867 A1 | 7/2022 | Taveira et al. | |
| 2022/0326031 A1 | 10/2022 | Ohnogi et al. | |

OTHER PUBLICATIONS

International Search Report and Written Opinion dated Jul. 31, 2022 in application No. PCT/US2022/071954 (11 pages).
International Search Report and Written Opinion dated Aug. 4, 2022 in application No. PCT/US2022/071952 (10 pages).
International Search Report and Written Opinion dated Dec. 7, 2022 in application No. PCT/US2022/44264 (11 pages).

* cited by examiner

DETERMINATION OF VEHICLE PULLOVER LOCATION CONSIDERING AMBIENT CONDITIONS

BACKGROUND

An autonomous vehicle (AV) can be used as a taxi, ride-sharing service, shuttle or similar vehicle that will pick up and/or drop off a passenger or package. Privately-owned AVs must perform similar passenger or package pickup or drop-off operations in response to a ride service request from the AV's owner or authorized user. When an AV performs a pickup or drop-off operation at a location that does not have a designated parking area (such as in front of a hotel or other building on a city street), the AV's navigation system must determine a location along a road where the pickup or drop-off will occur. When this happens, the AV must intelligently select a stop and/or pullover location.

However, the selection of a stop location is not the end of the AV's analysis. As the AV moves toward the selected stop location, ambient conditions can rapidly change, or the AV may detect new objects or environmental features as it gets closer to the selected stop locations. For example, a person may emerge from the building and walk toward the selected stop location. A parked vehicle that was previously shielded from view may come into view as the AV approaches the stop location. Or, as the AV gets closer it may detect that the stop location has a pothole, ground debris, or an obstacle that will interfere with opening a door of the AV. This new information may make the stop location physically impossible or impractical. Addressing situations such as this is a computationally challenging problem, especially in cluttered urban environments where available space to stop may be limited and numerous other actors must be considered before the vehicle implements any maneuver.

This document describes methods and systems that are directed to addressing the problems described above, and/or other issues.

SUMMARY

This document describes methods and systems for enabling an autonomous vehicle (AV) to determine a path to a stopping location. The AV will include a perception system that has various sensors, a motion control system, and a motion planning system. The AV will determine a desired stop location (DSL) that is associated with a service request, and the motion control system will move the AV along a path to the DSL. While moving along the path, the perception system will detect ambient conditions that are near the DSL. The ambient condition will be parameters associated with a stopping rule. The AV will apply the stopping rule to the ambient conditions to determine whether the stopping rule permits the AV to stop at the DSL. If the stopping rule permits the AV to stop at the DSL, the motion control system will move the AV to, and stop at, the DSL. Otherwise, the motion control system will not stop the AV at the DSL.

In some embodiments, the ambient conditions may include traffic density, traffic flow rate, or both of the road at the stop location. If so, then applying the stopping rule to the ambient conditions to determine whether the stopping rule permits the AV to stop at the DSL may include: (i) accessing a local map that includes the stop location; (ii) using the local map to determine a capacity of the road at the DSL; (iii) calculating a traffic density threshold or traffic flow rate threshold as a percentage of the capacity of the road at the stop location; and (iv) determining whether the detected traffic density exceeds the traffic density threshold, whether the detected traffic flow rate exceeds the traffic flow rate threshold, or both. Optionally, the ambient conditions also may include a posted speed limit at the DSL, If so, then when calculating the traffic density threshold or traffic flow rate threshold the system may select as the percentage a value that is a function of the posted speed limit. As another option, the ambient conditions may include a number of lanes in the road at the DSL, and if so then when calculating the traffic density threshold or traffic flow rate threshold the system select as the percentage a value that is a function of the number of lanes.

In some embodiments, when detecting the one or more ambient conditions, one or more forward-facing sensors of the AV's perception system may detect an occlusion that is positioned between a current location of the AV in the road and the DSL. If so, then the system may determine a visibility location at which the occlusion does not block a field of view from the AV to the DSL, along with a distance from the visibility location to the DSL. Then, when applying the stopping rule to the ambient conditions to determine whether the stopping rule permits the AV to stop at the DSL, the system may determine whether a vehicle traveling along the road at a posted speed limit of the road can stop within the distance without exceeding a deceleration level threshold.

In some embodiments, when detecting the one or more ambient conditions, one or more sensors of the AV's perception system may detect that a person who is walking or cycling is positioned near the DSL. When this happens, the system may determine a distance from the person to the DSL, along with a trajectory of the person. Then, when applying the stopping rule to the ambient conditions to determine whether the stopping rule permits the AV to stop at the DSL, the system may determine whether the distance and trajectory indicate that the person will reach the DSL or a threshold distance from the DSL before the AV will reach the DSL location according to a current trajectory of the AV.

In some embodiments, the ambient conditions may include characteristics of a ground area at the DSL. Applying the stopping rule to the ambient conditions to determine whether the stopping rule permits the AV to stop at the DSL may then include assessing whether the characteristics of the ground area indicate that none of the one or more ground hazards are present in the ground area.

In some embodiments, when detecting the one or more ambient conditions, the system may determine a cost that moving the AV to the DSL would impose on another actor that is proximate to the AV. When this happens, applying the stopping rule to the ambient conditions to determine whether the stopping rule permits the AV to stop at the DSL may include determining whether the cost will exceed a threshold.

In some embodiments, detecting the one or more ambient conditions may include detecting that an obstacle that was not previously present has entered the DSL. When this happens, then in response to detecting the obstacle, applying the stopping rule to the ambient conditions to determine whether the stopping rule permits the AV to stop at the DSL may include determining whether the obstacle will block the AV from accessing the DSL.

In some embodiments, upon determining that the stopping rule does not permit the AV to stop at the DSL, the system may identifying identify multiple candidate ASLs. For each of the candidate ASLs, the system may determine a cost to the AV for stopping at the ASL. The system may then selecting select, from the candidate ASLs, an ASL having the lowest determined cost. Determining the cost may be done on various ways. For example, the system may (i) determine a distance between the ASL and the DSL; (ii) assign a cost factor to the distance, wherein the cost factor increases with distance from the DSL; and (iii) determining the cost as a function of the cost factor. The system may then cause the motion control subsystem to move the AV to, and stop at, the ASL.

DETAILED DESCRIPTION

Figure 1:
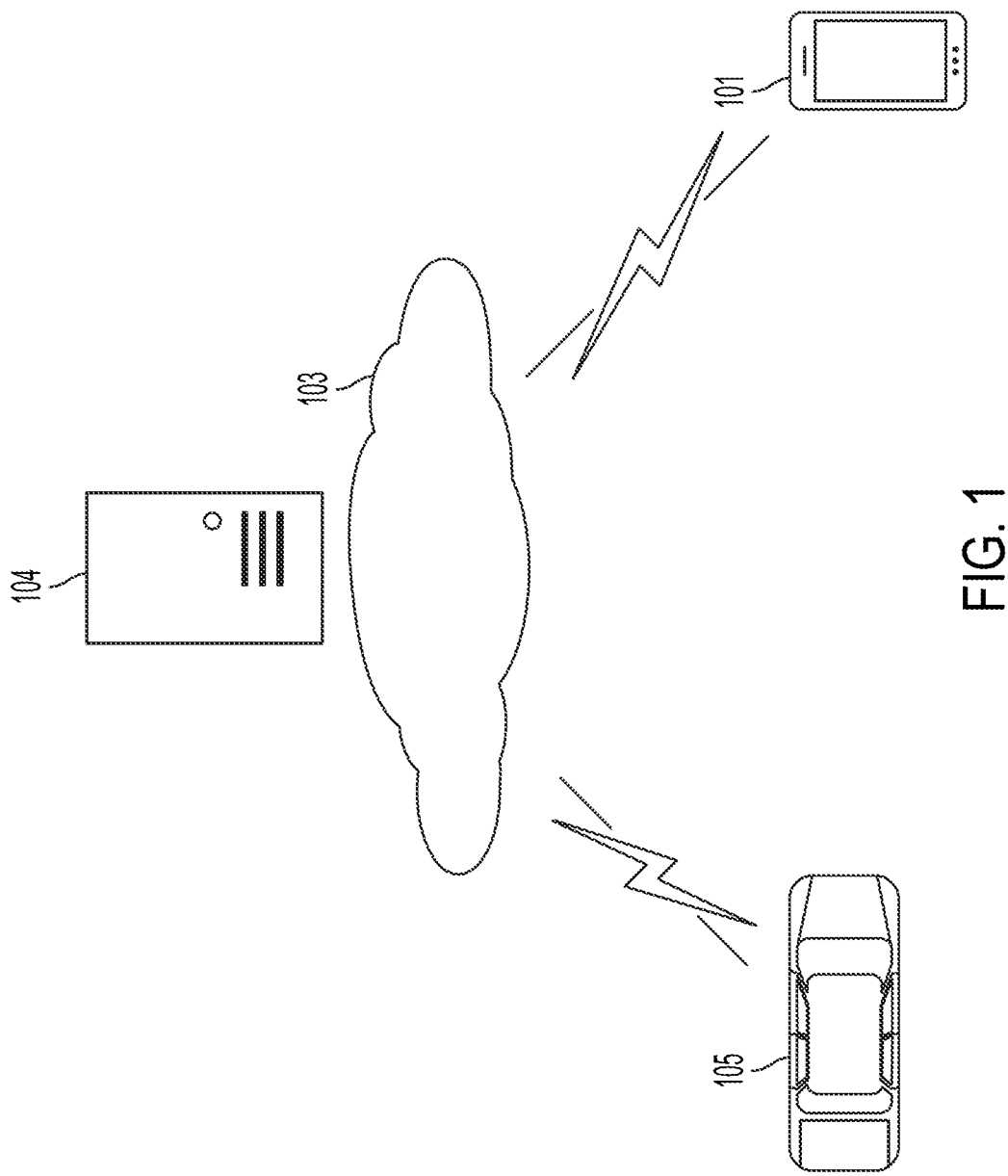
FIG. 1 illustrates example components of a system in which an autonomous vehicle (AV) receives a ride service request from an electronic device.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

This document describes processes by which an autonomous vehicle (AV) may make decisions about where and when to move when making a ride service trip during which the AV will pick up, drop off, or both pick up and drop off one or more passengers (which may be people or objects such as packages). A ride service may include any or all of the following elements: (1) navigating to a pickup location, and in particular a location at which the AV can stop to allow the passenger to get into the vehicle in compliance with permissible stopping criteria; (2) picking up the passenger by stopping for sufficient time for the passenger to board, and (optionally) time to complete one or more other pickup tasks; (3) navigating to a drop-off location, and in particular a location at which the AV can stop to allow the passenger to disembark in compliance with permissible stopping criteria; and (4) dropping off the passenger by stopping for sufficient time for the passenger to exit the vehicle, and (optionally) time to complete one or more other drop-off tasks. Elements (1) and (2) may be skipped if the vehicle is starting at a fixed point of origin such as a loading terminal, parking lot, or other predetermined location that is not dynamically determined.

When navigating in an environment, AVs rely on high definition (HD) maps. An HD map is a set of digital files containing data about physical details of a geographic area such as roads, lanes within roads, traffic signals and signs, barriers, and road surface markings. An AV uses HD map data to augment the information that the AV's on-board cameras, LiDAR system and/or other sensors perceive. The AV's on-board processing systems can quickly search map data to identify features of the AV's environment and/or to help verify information that the AV's sensors perceive.

Some pickup and drop-off locations may be predefined and stored in the available HD map. Such locations may include, for example: hotel driveways; airports; other locations with taxi, rideshare and/or shuttle stops; and other venues that have defined passenger pickup and/or drop-off locations. In such locations, the AV must be able to navigate to the predefined location but make adjustments if the passenger is not present at the location, or if obstacles prevent the AV from reaching the predefined location. In other areas such as urban environments, the pickup or drop-off location may not be fixed. For non-fixed locations, in each case the AV must dynamically determine when and where it can execute pickup and drop-off operations in compliance with permissible stopping criteria. The AV must be able to make these decisions in consideration of the criteria, passenger convenience and the burden that the AV's stop may place on other vehicles that are moving near the pickup/drop-off location.

To address this, the processes described in this document will consider the concepts of "Desired Stopping Locations" (DSLs), "Alternate Stopping Locations" (ASLs), and "Final Stopping Location" (FSL).

As used in this document, a Desired Stopping Location (DSL) is a location for which a passenger submits a request for a pickup or drop-off operation. In other words, it the location at which the passenger asks to board or exit the AV. This document also may use the term "loading point" as a synonym for a DSL.

An Alternate Stopping Location (ASL) is an area that is suitable for an AV to perform a pickup or drop-off operation when the DSL cannot be served.

A Final Stopping Location (FSL) is the location at which the AV actually stops to perform the pickup or drop-off operation. The FSL may be the DSL, the ASL, or another location.

Definitions for additional terms that are relevant to this document are included at the end of this Detailed Description.

The processes described in this document start with transmission and receipt a ride service request, which is illustrated by way of example in FIG. 1, in which a transceiver of an AV 105 receives a ride service request that a passenger electronic device 101 transmitted via a wireless communication network 103. The request is shown as transmitted via a remote server 104 that receives the request, processes it, and relays it to the AV via the network 103. However, the ride service request could also be transmitted directly from the passenger electronic device 101 to the AV 105, such as by a Bluetooth or other near-field or short range communication, in which the request could be to initiate a new ride service request or alter an existing ride service request. In addition, a ride service request may be directly input into a user interface of the AV, such as an in-dash touch screen display or a microphone that is part of a vehicle speech-to-text conversion system.

The passenger electronic device 101 is an electronic device containing a browser, a dedicated ride service application or another application via which a user of the device may submit a request for a vehicle ride by entering a starting point, a destination, or both The request will be in the form of data, transmitted via data packets, that includes a loading point or location for a loading operation, a loading point or other location for an unloading operation, and optionally other information such as identifying information about the passenger, as well as a pick-up time. The operator of the electronic device 101 may be the passenger who is requesting the ride, or someone else who is requesting the ride on behalf of the passenger. Further, in some embodiments the "passenger" need not be a person but could be a package, an animal, or another item for which the operator of the electronic device 101 submits a ride service request. In such situations the ride service request may actually be a delivery service request. For simplicity, except where specifically denoted when this document uses the term "ride service" it should be interpreted to include both passenger and package transportation services, and the term "passenger electronic device" should be interpreted to include devices operated by or on behalf of passengers as well as devices operated by individuals who seek delivery of a package.

Figure 2A:
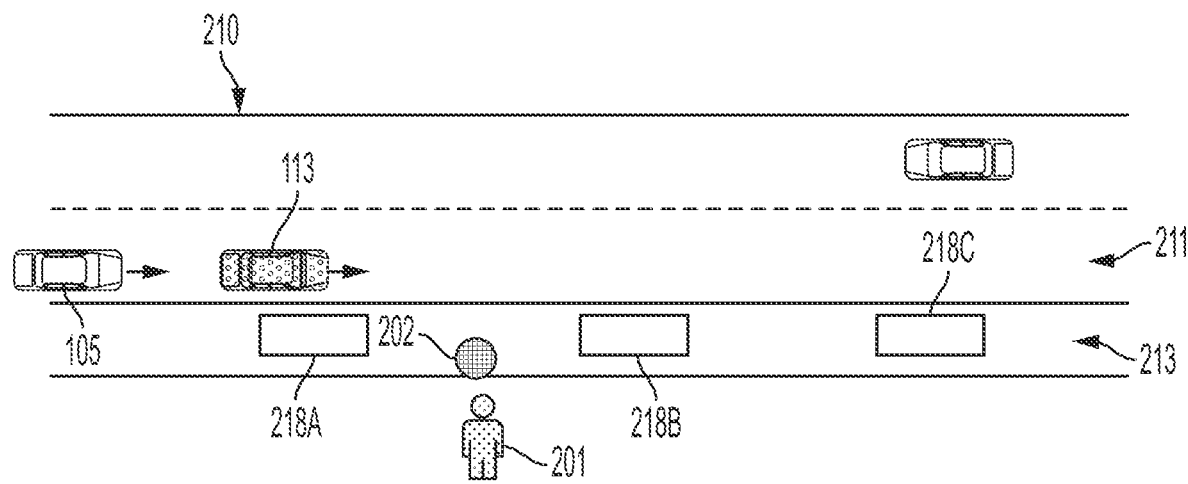
FIGS. 2A and 2B illustrate an example of how ambient conditions near a stopping location may change before the AV reaches the location.
Figure 2B:
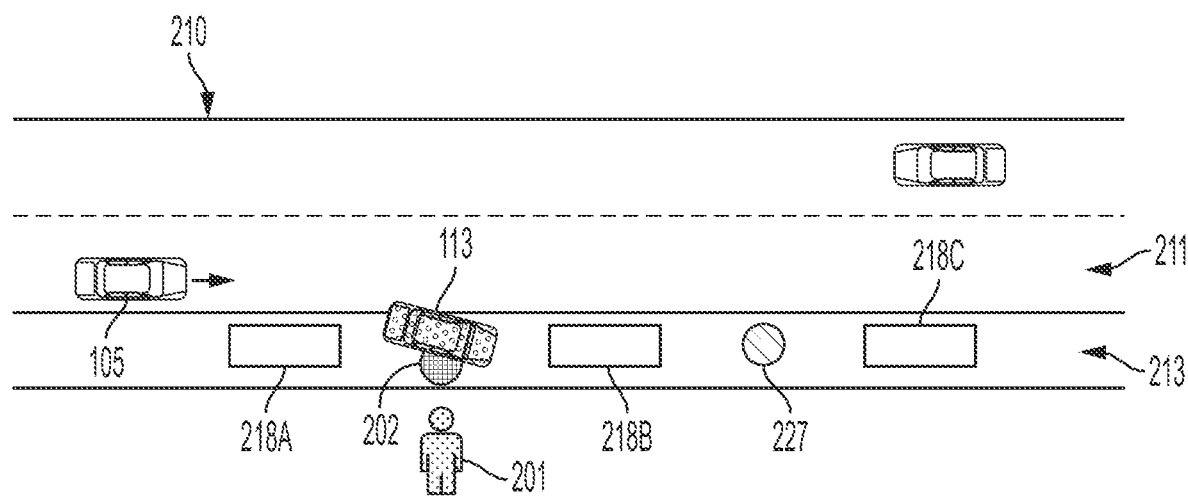

The concepts of a Desired Stopping Location, Alternate Stopping Locations and Final Stopping Location are illustrated by way of example in FIGS. 2A and 2B. In FIG. 2A the AV 105 has access to a map of an area, which in this example is a grid of several blocks of city streets, including street 210. Street 210 includes multiple lanes, including the AV's lane of travel 211 and a curbside or parking lane 213. The map will typically be stored in a memory device onboard the vehicle, although it could also be stored on a mobile electronic device or offboard server that is in communication with the AV. The map may be periodically updated by the remote server and/or augmented by information that the AV's perception system detects as the AV 105 moves through the area.

The AV 105 receives a service request to pick up or drop off a passenger 201 or package at a DSL 202. The AV 105 then determines a path or route via which the AV 105 may navigate to the DSL 202. The path will be a sequence of lane segments leading up to and including the DSL 202. As shown in FIG. 2A, any number of obstacles 218A-218C may be positioned near the DSL 202. The obstacles 218A-218C, which this document also may refer to alternatively as obstructions or occlusions, may be other vehicles, people, structures, signs or other items that prevent the AV from entering the DSL 202.

In FIG. 2A, no obstacles prevent the AV 105 from accessing the DSL 202. However, as time passes and the AV gets closer to the DSL, FIG. 2B illustrates that another vehicle 113 that was in front of the AV 105 enters the DSL and thus blocks access to the DSL 202. This prevents the AV from stopping at the DSL 202. The AV's perception system will identify and detect this option, and since the DSL is blocked the AV's motion planning system must determine one or more alternate stopping locations such as ASL 227 into which the AV 105 may move. If an ASL is available within a threshold distance from the DSL 202, the AV 105 may alter its path and move to the ASL 227 instead of the DSL 202. If multiple ASLs are available the system may choose a FSL from the candidate ASLs using procedures that will be described in more detail below. If the AV cannot identify a suitable ASL within a threshold distance from the DSL 202, it may abort the stopping operation and continue on a new route, which may include circling back to the DSL at a future time.

Figure 3:
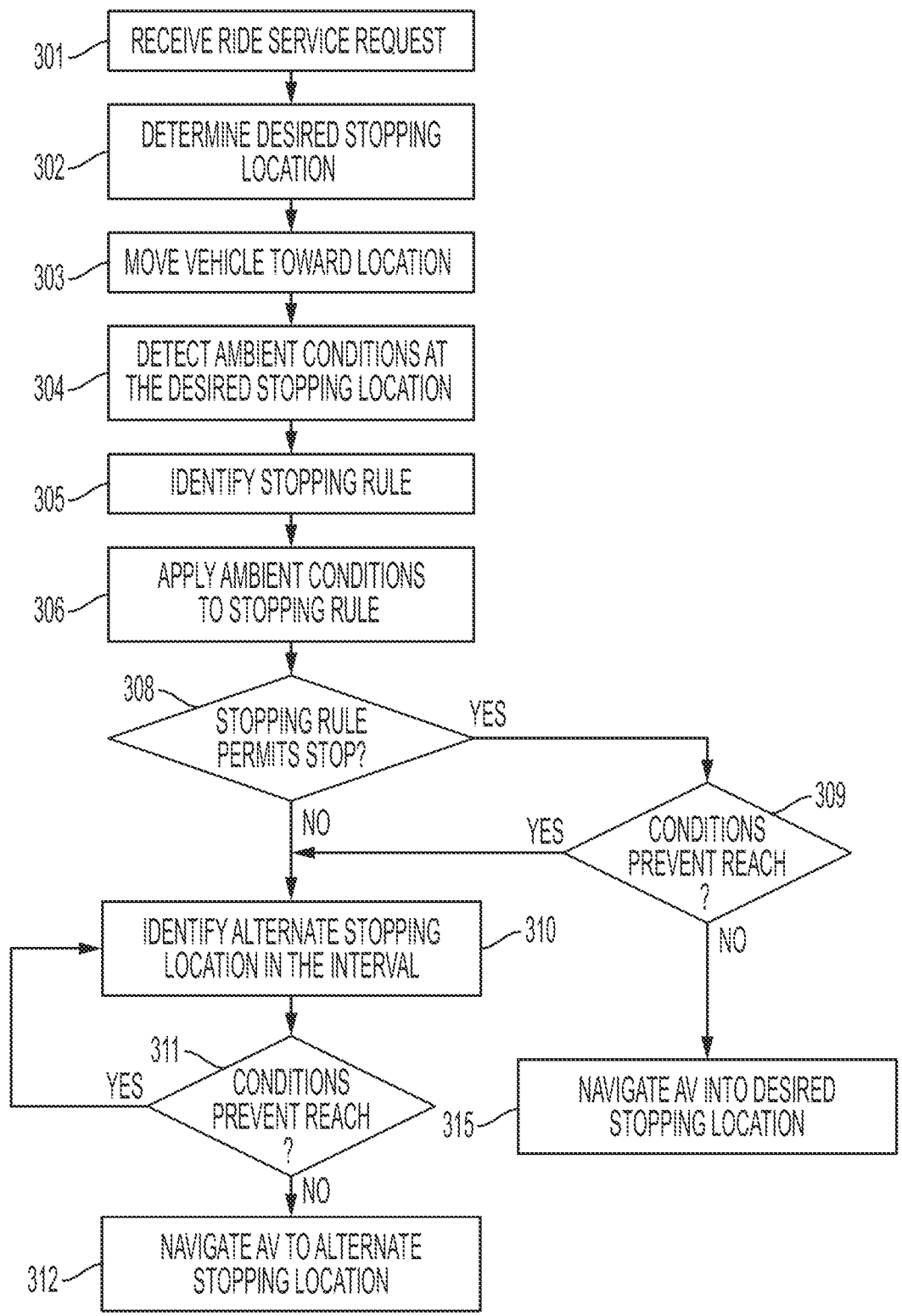
FIG. 3 is a flow diagram illustrating example steps by which an AV may determine a final stopping location for a pickup or drop-off service request.

Methods by which the AV will determine whether to stop at the DSL or choose an ASL will be described below. In particular, FIG. 3 is a flow diagram illustrating example steps by which an AV may determine whether to move to a DSL or find an ASL for a pickup or drop-off service request. At 301 the AV will receive a ride service request that was transmitted to the AV by a ride service application on a passenger electronic device, either directly via a remote server that receives the request, processes it, selects the AV to handle the request, and transmits the request to the AV. The request will be in the form of data that includes a DSL (or information from which the AV may derive a DSL) for a loading operation, a DSL (or information from which the AV may derive a DSL) for an unloading operation, and optionally other information such as identifying information about the passenger, as well as a pick-up time.

At 302 the AV will determine a DSL for a loading or unloading operation of the ride service request. The DSL will be determined as a location on the map or a set of geographic coordinates that correlate to the map. The AV may receive the DSL as coordinates that are included in the service request. Alternatively, the AV or an intermediate server may use data from the service request to identify the DSL. For example, the ride service request may include an address, landmark or other location at which the passenger requests a loading operation. Such locations may include, for example, the entrance of a specified building, or a transit stop. The AV or intermediate offboard server may then determine the coordinates in the map data that correspond to the service request location, and it may designate those coordinates as the DSL.

Figure 4:
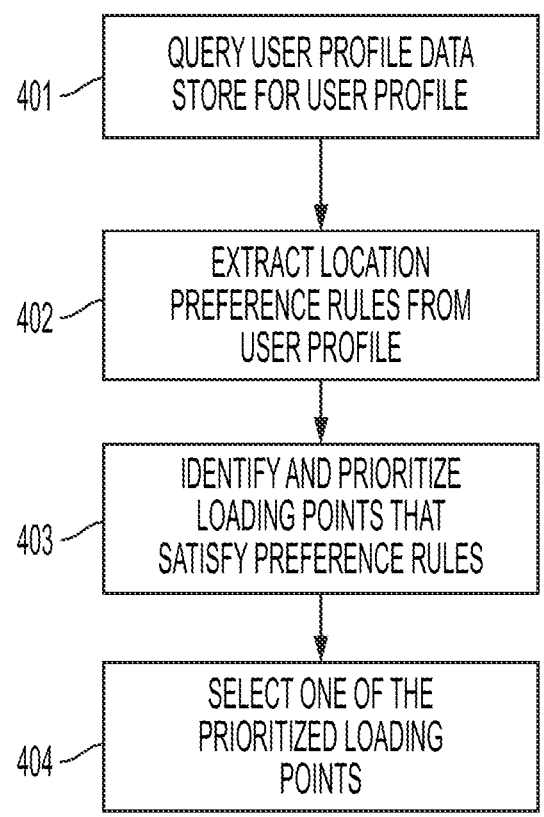
FIG. 4 is flowchart illustrating a process for using user preference data to determine a loading point for a ride service.

In addition or alternatively, as illustrated in FIG. 4 at 401 to determine the DSL the system may use a user identifier associated with the passenger electronic device to query a user profile data store to identify a stored profile that is associated with the same user identifier. The user profile data store may be part of a remote server such as server 104 of FIG. 1, stored in the AV's onboard memory, or a combination of the two. At 402 the system may extract, from the identified profile, one or more location preference rules for the user. At 403 the system will then analyze the map data and only consider a location to qualify to be a DSL if it satisfies at least a threshold number of the user's location preference rules. In addition, the system may rank, score and/or otherwise prioritize candidate loading points depending on how many of the location preference rules they satisfy, or by assigning each location a score that in which some location preference rules are given higher weights than others. For example, the rules may require that a DSL be positioned in a lane segment or group of lane segments that are located in front of an entry door of a building having a location that corresponds to a location of the electronic device, or the rules may assign a relatively higher weighted value to such lane segments in a scoring algorithm. Alternatively, the rules may require that any DSL be midway between or close to the cross street that is next in the direction of traffic while remaining at least six meters (or another suitable threshold distance) away from that cross street, or that is no longer than a specified walking distance from a designated point. The rules also may assign relatively higher weighted values to such lane segments in a scoring algorithm. In addition, if the user profile includes a stored DSL from a previous ride service, the rules may require that the system give first priority to and use the stored DSL as the loading point for the current ride sharing request at 404. Optionally, the system may require that the DSL meet both user preference criteria and one or more rules such as those discussed below.

Returning to FIG. 3, at 303 the vehicle will move the AV along a path toward the DSL. Example methods of path planning and vehicle movement will be described below, although any now or hereafter known path planning and automated motion processes may be used. At 304 as the AV approaches the DSL the AV will use one or more sensors of its perception system to detect one or more ambient conditions that are present at the DSL. At 305 the system will identify a stopping rule and at 306 the system may apply the ambient conditions to the stopping rule to determine whether the stopping rule permits the AV to stop at the DSL when considering the ambient conditions (step 308).

As an example of the process of steps 305-308, as was shown in FIG. 2, a stopping rule may mandate that the AV not stop at a DSL if another vehicle has moved into the DSL. An example of this was shown in FIG. 2 in which vehicle 218C moved into the DSL 202 and thus prevented the AV 105 from moving into the DSL.

Other ambient conditions, and stopping rules that may consider those conditions, include:

The ambient conditions may include a traffic density, a traffic flow rate, or both of the road at the DSL. Traffic density is a measurement of the number of vehicles per unit length in a given area. Higher density means more traffic congestion. Traffic flow rate is a measurement of the number of vehicles per unit of time that pass a location. Higher flow rate means stopping may more significantly impact the traffic flow rate if the AV cannot clear traffic (e.g. pull into a parking spot). The system may not favor pulling over to stop when traffic density or traffic flow rate is higher than a threshold at the stopping location. To determine either the traffic density or traffic flow rate, the system may (a) access a data set containing historical or statistical data for the road given previously collected data at various dates and times and select a statistic from the data for a date and time that corresponds to the current time; (b) receive data transmitted from a traffic service; or (c) implement a combination of these or other processes. The stopping rule may require that the system access a map that includes the DSL, extract from data in the map a capacity of the road at the DSL, and calculate a traffic density threshold or traffic flow rate threshold as a percentage of the capacity of the road at the stop location. Optionally the ambient conditions also may include a posted speed limit at the DSL, which the AV may receive from the map data or detect using a camera that extracts a speed limit that is printed on a traffic sign. If so, the system may use the posted speed limit to determine the traffic density threshold or traffic flow rate threshold. In addition, when calculating the traffic density threshold or traffic flow rate threshold the system may determine (from map data or data received by the AV's perception system) a number of lanes in the road at the DSL. If so, the system may select as the threshold percentage a value that is a function of the number of lanes. In any of these situations, the system may then determine whether the detected traffic density or flow rate exceeds the threshold. If the traffic density or flow rate exceeds the applicable threshold, the system may not permit the AV to stop at the ASL. However, if the traffic density or flow rate does not exceed the applicable threshold, then the system may allow the AV to stop at the ASL.

The ambient conditions may include detection of a person who is walking or cycling is positioned near (i.e., within a threshold distance from) the DSL. If so, the system may determine a distance from the person to the DSL and optionally a trajectory of the person, Then, the stopping rule may permit the AV to stop at the DSL if the person will not reach the DSL or a threshold distance from the DSL before the AV will reach the DSL location according to a current trajectory of the AV. Otherwise, the stopping rule may prohibit the AV from moving to the DSL.

The ambient conditions may include characteristics of a ground area at the DSL. For example, the AV's cameras may take images of the DSL and process the images to classify one or more features of the ground area. Some features, such as potholes, puddles, or ground debris may be classified as potential or actual ground hazards. If so, then the stopping rule may permit the AV to stop at the DSL if the person no ground hazards exist. Otherwise, the stopping rule may prohibit the AV from moving to the DSL.

The ambient conditions may include detecting multiple occlusions that block the AV's view of various locations on of the road as the AV approaches the DSL. If occlusions block the AV's view, the system may reason that the occlusions will also determine that the occlusions are likely to block other vehicle's view of the occluded locations. If so, then the stopping rule may dictate that the AV not stop at the DSL it has determined that the occluded locations will prevent other drivers from seeing occluded locations on approach to the DSL.

The ambient conditions may include an occlusion that is positioned between a current location of the AV in the road and the DSL and that blocks the AV's view of the DSL. If so, then when moving toward the DSL the AV also may estimate a visibility location at which the occlusion does not block a field of view of the AV's perception system from the AV to the DSL, and the AV may determine a distance from the visibility location to the DSL (as reflected in map data, or using the AV's perception system). Optionally, the system may also adjust the distance by a factor to account for a difference between AV sensors and human perception, to consider other human-operated vehicles. The stopping rule may dictate that if a vehicle traveling along the road at a posted speed limit of the road can stop within the distance without exceeding a deceleration level threshold, the AV may stop at the DSL. Otherwise the AV may not be permitted to stop at the DSL.

Figure 5:
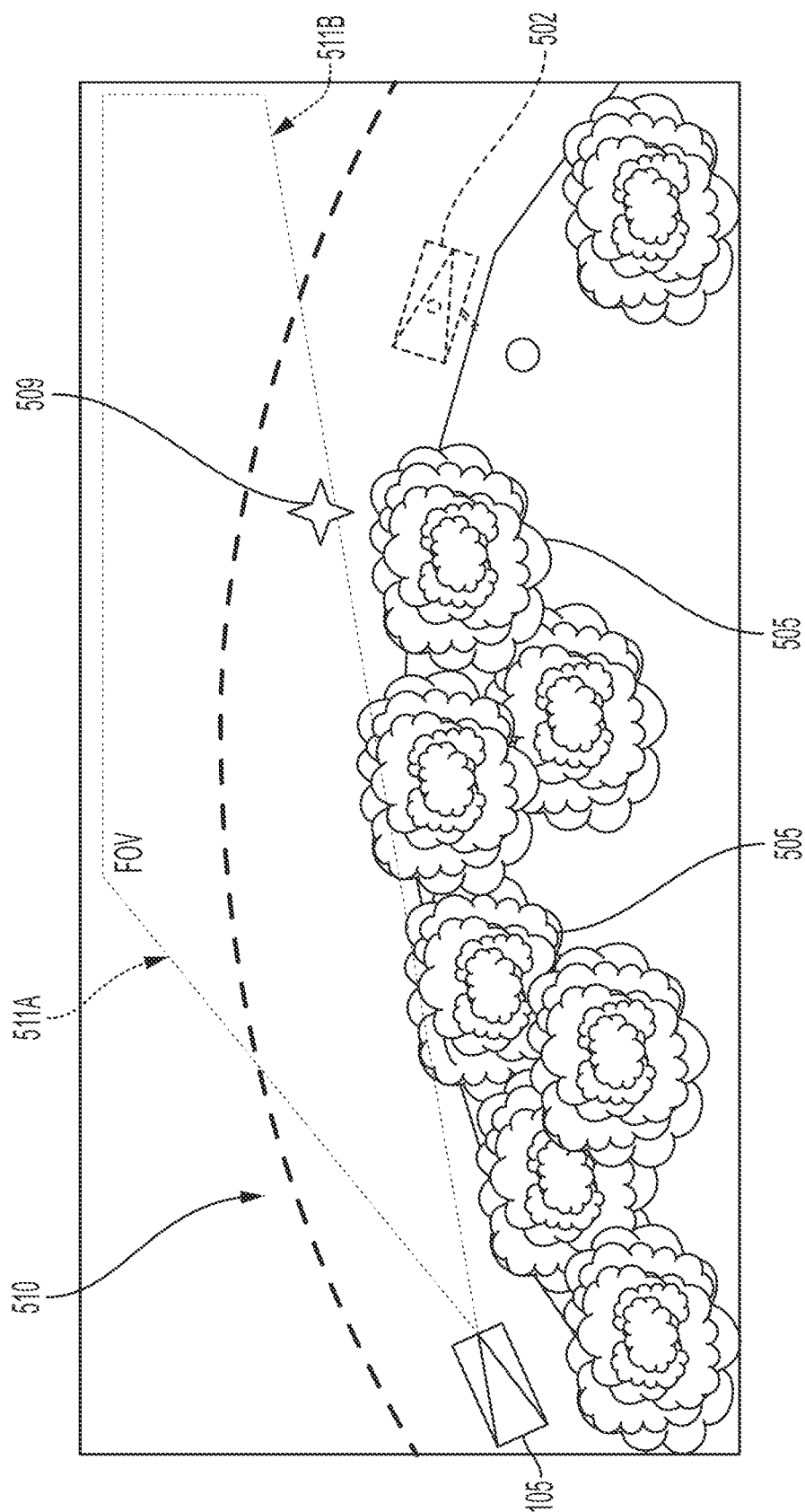
FIG. 5 illustrates another example of ambient conditions that may cause an AV to abort a stopping operation or choose an alternate stopping location.

The example of the previous paragraph is illustrated by way of example in FIG. 5, in which the AV 105 approaches a DSL 502 but the AV's field of view (defined by boundaries 511A and 511B) is limited by obstructions 505, which in this case are trees alongside of the curved road 510. The first location at which the AV's perception system may be able to visualize the DSL 502 is visibility location 509. Optionally, the system may adjust the visibility location by a factor to account for a difference between AV sensors and human perception, to consider other human-operated vehicles. The system may calculate the distance between DSL 502 and visibility location 509, along with a posted speed limit for the road 510, in each case from map data, perception data, or both. The system may then determine a deceleration value that is an amount by which another vehicle traveling at the posted speed limit at visibility location 509 must in order to stop at DSL 502. The system may measure this using any suitable method, such as determining deceleration value $D=-(S^2/2\ d)$. in which S is the posted speed limit and d is the distance between DSL 502 and visibility location 509. If the deceleration value is less than a threshold value (which may be stored in memory, and which may be determined based on comfort, safety or other factors), then the system may permit the AV 105 to stop at DSL 502. However, if the deceleration value is more than the threshold value, then the system may require the AV 105 to find an ASL or abort the stop operation.

The stopping rules are not limited to the examples above. Other rules may be used. In addition, the system may require that the ambient conditions satisfy more than one, or all of, the stopping rules before permitting the AV to enter the DSL. The system also may consider whether the ambient conditions will permit the AV to return to the flow of traffic from the stopping locations, using rules such as those described above for the anticipated trajectory from the stopping location to the lane at traveling speed.

Returning to FIG. 3, if the application of ambient conditions to the stopping rule permits the AV to stopping at the DSL (308:YES), then the AV's motion control system may cause the AV to continue moving along the path into the DSL, and to stop at the DSL. However, if the stopping rule's analysis does not permit the AV to stop in the DSL (308:NO), then at 310 the AV's motion planning system may use perception data about an area that is within a threshold distance from the DSL to identify one or more alternate stopping locations. To qualify as an ASL the location may be required to be free from occlusion that will prevent the AV from stopping there. Optionally, each ASL also must satisfy one or more permissible stopping location criteria, such as:

Distance from curb: If stopping in a parking lane, the ASL must be within a threshold distance from the curb; if stopping in a lane of travel, the ASL must be biased to the right of the lane, optionally partially extending to an area that is outside of the lane.

Remaining lane width: In addition to or instead of distance from the curb, if the AV will stop fully or partially in a lane of travel it may consider the amount or size of the lane that will remain unblocked when it stops. The system may give preference to ASLs that will allow for a relatively larger remaining lane width than it gives to those that require a relatively smaller remaining lane width.

Distance from DSL: The ASL may be required to be no more than a threshold distance from the DSL. The threshold may vary based on specified conditions. For example, if the service request includes a heavy package or a passenger with limited mobility, the threshold may be shorter than a default as described above. The threshold also may be reduced during certain environmental conditions, such as rain or snow.

Gap between objects pairs adjacent to the DSL: An ASL of larger size (as defined by the locations of a pair of objects positioned in front of and behind the ASL) may be given preference to over an ASL that is of smaller size, especially if the smaller size will require the AV to angle into the ASL and remain partially protruding into the lane of travel.

Kinematic constraints of the vehicle: Steering limits of the vehicle's platform may limit the vehicle's ability to navigate into an ASL without exceeding a threshold number of multiple-point turns or forward/reverse gear changes. The system may give preference to those ASLs that do not require the thresholds to be exceeded, or which require relatively fewer multiple-point turns and/or forward/reverse gear changes.

Deceleration limits: An ASL that will require the AV to decelerate at a rate that is higher than a threshold in order to stop may be given less preference or avoided entirely. The system may determine the required deceleration by dividing the distance from the AV to the ASL by the vehicle's current speed.

Types and/or locations of objects or road features adjacent to the ASL: Some classes of objects (such as delivery trucks) are more likely to move or have people appear around them than other classes of objects (such as potholes or road signs). The system may give lower preference to ASLs that are adjacent to objects that are more likely to move. The system also may give lower preference to ASLs with (i) objects that are positioned in locations that would interfere with the opening of a curbside door of the AV, or (ii) certain features of the road at the ASL such as the presence of a driveway.

Alignment of the AV. The system may give preferences to ASLs in which the AV can position itself so that a side of the AV is relatively more parallel to the curb. This may mean giving preference to ASLs in which the curb is straight rather than curved, or ASLs that are shorter and cannot accommodate the full width of the AV.

The permissible stopping location criteria listed above are only examples. Any of these and/or other permissible stopping location criteria may be used.

When identifying the ASL in step 310, the system may identify more than one candidate ASL. If so, then it may use one of several possible methods to select the candidate ASL as the FSL into which the vehicle should move. For example, the system may select as the FSL the candidate ASL that meets the greatest number of the permissible stopping location criteria. Some of the permissible stopping location criteria may be designated as gating criteria, such that a location will not even be considered to be an ASL if it does not meet the gating criteria. Other criteria may be used to rank candidate ASLs and select the ASL with the highest rank.

Figure 6A:
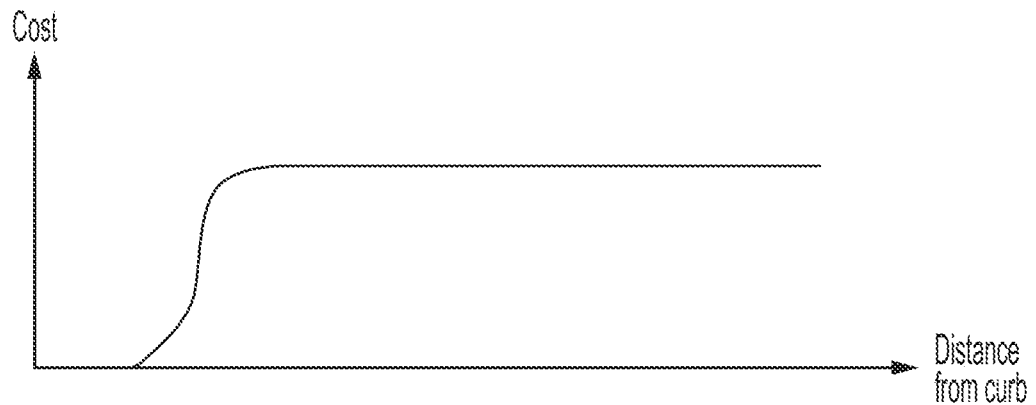
FIGS. 6A-6D illustrate example cost functions for selecting alternate stopping locations.
Figure 6B:
Figure 6C:
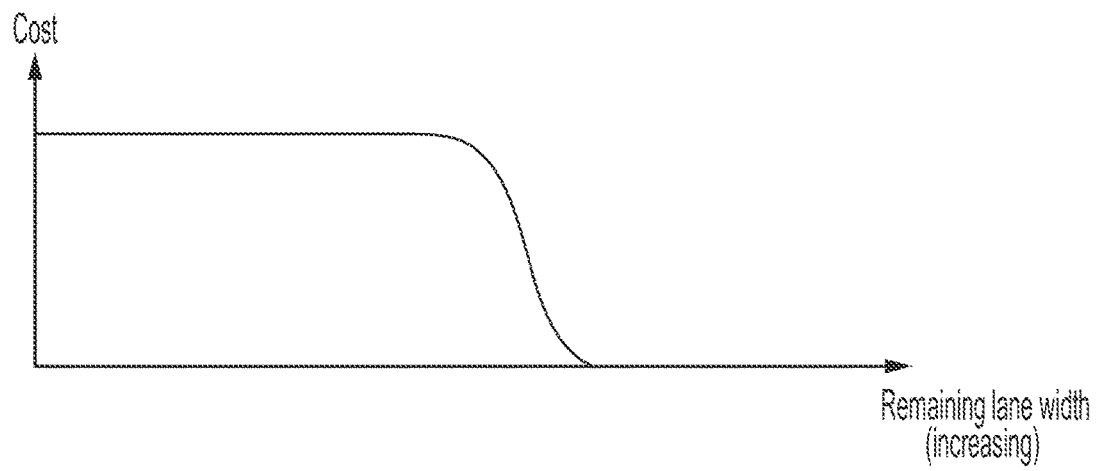

Any or all of the permissible stopping location criteria may be weighted or be associated with a cost element, such that a cost function sums or otherwise factors the cost elements for each criterion that is satisfied and yields an overall cost for each candidate ASL. For example, as illustrated in FIGS. 6A-6D, a cost function may sum various cost function elements of various candidate stopping locations. FIG. 6A illustrates an example cost function that assigns a lower cost value (and in some cases no cost) to ASLs that are relatively closer to the curb, with higher cost values to stopping locations that are relatively further from the curb. FIG. 6B illustrates an example cost as a function of an ASL's distance from the DSL, with higher cost values to stopping locations that are relatively further from the DSL. FIG. 6C illustrates an example cost function that assigns a lower cost value (and in some cases no cost) to ASLs that are will allow relatively larger potions of a lane of travel to remain unobstructed.

Figure 6D:
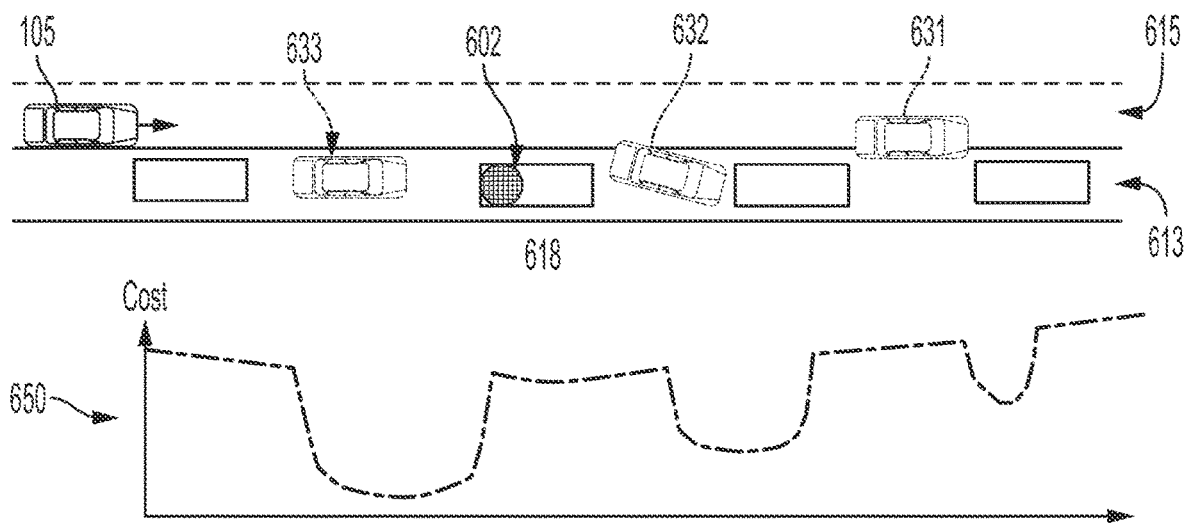

Finally, FIG. 6D illustrates how the system may select a candidate ASL in a parking lane 613 in which the DSL 602 has been blocked by an obstruction 618. The cost function 650 sums all of the cost elements illustrated in FIGS. 6A-6C (and optionally other cost elements) to determine a candidate stopping location cost for each candidate ASL 631-633. Locations at which obstructions are located are not considered to be candidate ASLs and therefore have high costs in the cost function 650. A first candidate ASL 631 in which the AV would block a significant portion of the lane of travel 615 and would be farthest from the DSL and farthest from the curb is the candidate ASL with the highest cost. A second candidate ASL 632 in which the AV only partially extends into the lane of travel 615 and which is relatively closer to the curb, but which is past the DSL, is the candidate ASL with the second highest cost. A third candidate ASL 633 allows the AV to fully avoid the lane of travel 615 and get closest to the curb, and is closest to the DSL has the lowest cost. The system therefore selects the third candidate ASL 633 and moves the AV 105 into that ASL 633.

Returning to FIG. 3, before moving the AV into a DSL or ASL, then in either step 309 or 311 the AV's motion planning system may determine whether environmental or traffic conditions near the DSL or ASL prevent the AV from reaching the ASL without taking an action that imposes greater than a threshold cost on other actors in the area. For example, if another vehicle is following the AV at a speed S and distance d within which it could not stop during an expected time T for the loading operation without hitting the AV (i.e., if d is less than or equal to S*T plus a buffer distance), or if the pickup/drop-off operation would require the other vehicle to decelerate by more than a threshold value, it may determine that the other vehicle will not be able to non-suddenly stop. The system may then not choose that stopping location and instead it may identify an ASL that does not cause the other vehicle to engage in such an action.

It is also notable that an AV's onboard systems will evaluate the environment in which the AV is traveling over multiple cycles, and continuously make adjustments. The AV's perception and motion planning systems may continuously monitor objects and environmental conditions to determine whether the selection of an ASL should change. As other objects move in or out of area around the DSL, the changed conditions may prevent or hinder the AV from reaching the stopping location (as in steps 309 and 311 above). The AV will recalculate candidate ASLs and move to a different ASL if conditions warrant such a change, using steps such as steps 304-308 above.

Figure 7:
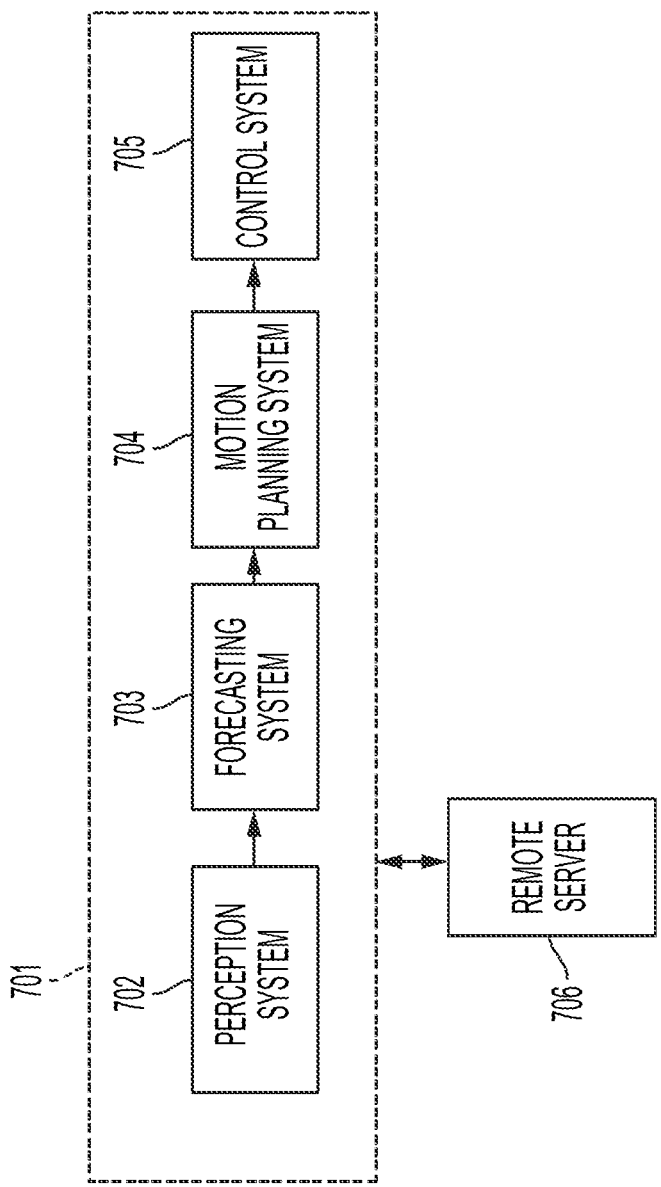
FIG. 7 is a block diagram that shows a high-level overview of certain AV subsystems.

FIG. 7 shows a high-level overview of AV subsystems that may be relevant to the discussion above. Specific components within such systems will be described in the discussion of FIG. 8 later in this document. Certain components of the subsystems may be embodied in processor hardware and computer-readable programming instructions that are part of the AV's on-board computing system 701. The subsystems may include a perception system 702 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

The vehicle's perception system 702 may deliver perception data to the vehicle's forecasting system 703. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 704 and control system 705 so that the receiving systems may assess such data and initiate any number of reactive motions to such data. The motion planning system 704 and control system 705 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

The vehicle's on-board computing system 701 will be in communication with a remote server 706. The remote server 706 is an external electronic device that is in communication with the AV's on-board computing system 701, either via a wireless connection while the vehicle is making a run, or via a wired or wireless connection while the vehicle is parked at a docking facility or service facility. The remote server 706 may receive data that the AV collected during its run, such as perception data and operational data. The remote server 706 also may transfer data to the AV such as software updates, high definition (HD) map updates, machine learning model updates and other information.

Figure 8:
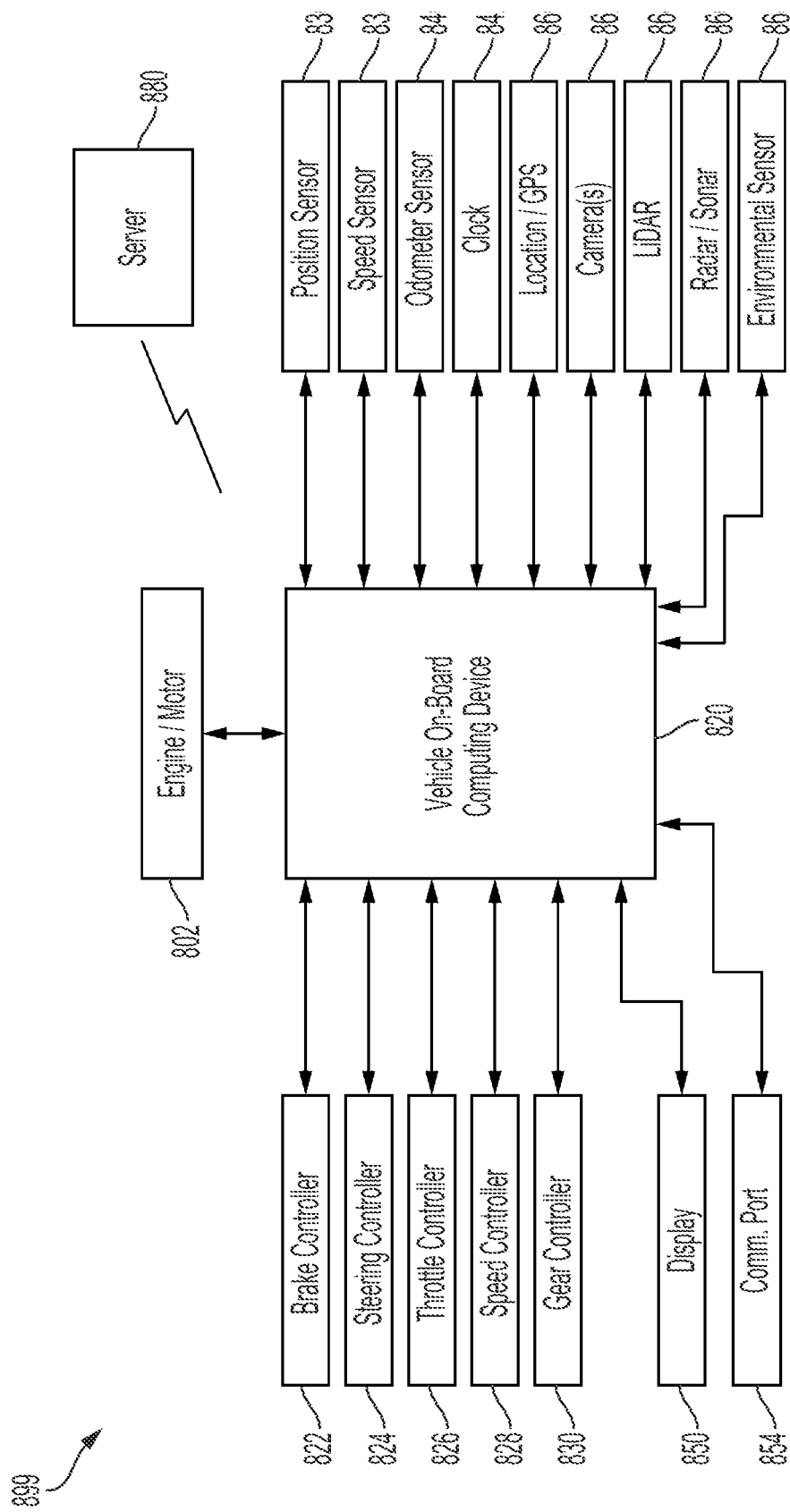
FIG. 8 illustrates example systems and components of an autonomous vehicle.

FIG. 8 illustrates an example system architecture 899 for a vehicle, such as an AV. The vehicle includes an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 such as a global positioning system (GPS) device; object detection sensors such as one or more cameras 862; a LiDAR sensor system 864; and/or a radar and or and/or a sonar system 866. The sensors also may include environmental sensors 868 such as a precipitation sensor and/or ambient temperature sensor. The object detection sensors may enable the vehicle to detect moving actors and stationary objects that are within a given distance range of the vehicle 899 in any direction, while the environmental sensors collect data about environmental conditions within the vehicle's area of travel. The system will also include one or more cameras 862 for capturing images of the environment. Any or all of these sensors will capture sensor data that will enable one or more processors of the vehicle's on-board computing device 820 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device 854 (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 820. The on-board computing device 820 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 820 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors) to the on-board computing device 820. The object detection information and/or captured images may be processed by the on-board computing device 820 to detect objects in proximity to the vehicle. In addition or alternatively, the AV may transmit any of the data to an external server 880 for processing. Any known or to be known technique for performing object detection based on sensor data and/or captured images can be used in the embodiments disclosed in this document.

In addition, the AV may include an onboard display device 850 that may generate and output an interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 9:
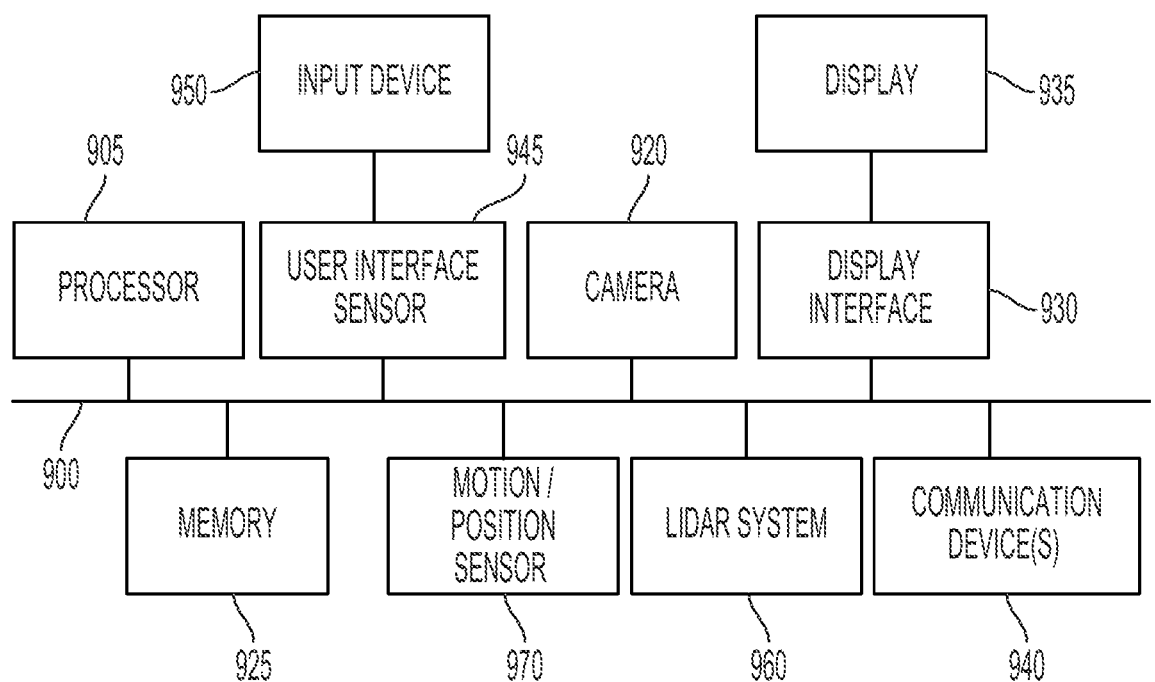
FIG. 9 is a block diagram that illustrates various elements of a possible electronic subsystem of an AV and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions that are stored on one or more memory devices 925. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "ride" refers to the act of operating a vehicle to move from a point of origin to a destination in the real world, while carrying a passenger or cargo that embarks or is loaded onto the vehicle at the point of origin, and which disembarks or is unloaded from the vehicle at the destination.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device", "server" or "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. A computer program product is a memory device with programming instructions stored on it. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method, comprising:
by a processor of an autonomous vehicle (AV), upon receipt of a service request, wherein a desired stop location (DSL) is associated with the service request:
   causing a motion control system of the AV to move the AV along a path toward the DSL;
   while moving along the path toward the DSL, using one or more sensors of the AV to detect one or more ambient conditions that are near the DSL, wherein each of the one or more ambient conditions comprises a parameter associated with a stopping rule;
   applying the stopping rule to the one or more ambient conditions to determine whether the stopping rule, when considering the ambient conditions, permits the AV to stop at the DSL; and
   if the stopping rule permits the AV to stop at the DSL, causing the motion control subsystem to move the AV to and stop at the DSL, otherwise directing the motion control system to not stop the AV at the DSL.

2. The method of claim 1, wherein:
detecting the one or more ambient conditions comprises determining a traffic density or traffic flow rate of a road at the DSL; and
applying the stopping rule to the ambient conditions to determine whether the stopping rule permits the AV to stop at the DSL comprises:
   accessing a local map that includes the DSL,
   determining, from the local map, a capacity of the road at the DSL,
   calculating a traffic density threshold or traffic flow rate threshold as a percentage of the capacity of the road at the stop location, and
   determining whether the traffic density exceeds the traffic density threshold, whether the traffic flow rate exceeds the traffic flow rate threshold, or both.

3. The method of claim 2 wherein:
detecting the one or more ambient conditions further comprises determining a posted speed limit at the DSL; and
calculating the traffic density threshold or traffic flow rate threshold comprises selecting as the percentage a value that is a function of the posted speed limit.

4. The method of claim 2 wherein:
detecting the one or more ambient conditions further comprises determining a number of lanes in the road at the DSL; and
calculating the traffic density threshold or traffic flow rate threshold comprises selecting as the percentage a value that is a function of the number of lanes.

5. The method of claim 1, wherein:
detecting the one or more ambient conditions comprises:
- detecting, via one or more forward-facing sensors of the AV, an occlusion that is positioned between a current location of the AV in a road and the DSL,
- determining a visibility location at which the occlusion does not block a field of view from the AV to the DSL, and
- determining a distance from the visibility location to the DSL; and applying the stopping rule to the ambient conditions to determine whether the stopping rule permits the AV to stop at the DSL comprises determining whether a vehicle traveling along the road at a posted speed limit of the road can stop within the distance without exceeding a deceleration level threshold.

6. The method of claim 1, wherein:
detecting the one or more ambient conditions comprises:
- detecting, via one or more sensors of the AV, that a person who is walking or cycling is positioned near the DSL, and
- determining a distance from the person to the DSL and a trajectory of the person; and applying the stopping rule to the ambient conditions to determine whether the stopping rule permits the AV to stop at the DSL comprises determining whether the distance and trajectory indicate that the person will reach the DSL or a threshold distance from the DSL before the AV will reach the DSL according to a current trajectory of the AV.

7. The method of claim 1, wherein:
detecting the one or more ambient conditions comprises detecting, via one or more sensors of the AV, characteristics of a ground area at the DSL; and
applying the stopping rule to the ambient conditions to determine whether the stopping rule permits the AV to stop at the DSL comprises assessing whether the characteristics of the ground area indicate that none of one or more ground hazards are present in the ground area.

8. The method of claim 1 wherein:
detecting the one or more ambient conditions comprises determining a cost that moving the AV to the DSL would impose on another actor that is proximate to the AV; and
applying the stopping rule to the ambient conditions to determine whether the stopping rule permits the AV to stop at the DSL comprises determining whether the cost will exceed a threshold.

9. The method of claim 1 wherein:
detecting the one or more ambient conditions comprises determining that an obstacle that was not previously present has entered the DSL; and
applying the stopping rule to the ambient conditions to determine whether the stopping rule permits the AV to stop at the DSL comprises, in response to detecting that the obstacle that was not previously present has entered the DSL, determining whether the obstacle will block the AV from accessing the DSL.

10. The method of claim 1 further comprising, upon determining that the stopping rule does not permit the AV to stop at the DSL:
- identifying a plurality of candidate alternate stopping locations (ASLs);
- for each of the candidate ASLs, determining a cost to the AV for stopping at the ASL;
- selecting, from the candidate ASLs, an ASL having the lowest determined cost; and
- causing the motion control subsystem to move the AV to, and stop at, the selected ASL.

11. The method of claim 10 wherein, for each of the candidate ASLs, determining the cost to the AV for stopping at the ASL comprises:
- determining a distance between the ASL and the DSL;
- assigning a cost factor to the distance, wherein the cost factor increases with distance from the DSL; and
- determining the cost as a function of the cost factor.

12. The method of claim 1, wherein:
applying the stopping rule to the one or more ambient conditions comprises applying a plurality of stopping rules to a plurality of ambient conditions to determine whether at least a threshold number of the stopping rules are satisfied by the ambient conditions at the DSL; and causing the motion control subsystem to move the AV to and stop at the DSL is performed in response to at least the threshold number of the stopping rules being satisfied by the ambient conditions at the DSL.

13. A system for a vehicle, comprising:
a perception system comprising a plurality of sensors;
a motion control system; and
a motion planning system comprising a processing device and a memory containing programming instructions that are configured to cause the processing device to, in response to receipt of a service request that includes a desired stop location (DSL):
- cause the motion control subsystem to move an autonomous vehicle (AV) along a path toward the DSL,
- while causing the AV to move along the path toward the DSL, use the perception system to detect one or more ambient conditions that are near the DSL, wherein each of the one or more ambient conditions comprises a parameter associated with a stopping rule,
- apply the stopping rule to the one or more ambient conditions to determine whether the stopping rule, when considering the ambient conditions, permits the AV to stop at the DSL, and
- if the stopping rule permits the AV to stop at the DSL, cause the motion control system to move the AV to and stop at the DSL, otherwise direct the motion control system to not stop the AV at the DSL.

14. The system of claim 13, wherein:
the instructions to detect the one or more ambient conditions comprise instructions to determine a traffic density or traffic flow rate of a road at the DSL; and
the instructions to apply the stopping rule to the ambient conditions to determine whether the stopping rule permits the AV to stop at the DSL comprise instructions to:
- access a local map that includes the DSL,
- determine, from the local map, a capacity of the road at the DSL,
- calculate a traffic density threshold or traffic flow rate threshold as a percentage of the capacity of the road at the DSL, and
- determine whether the detected traffic density exceeds the traffic density threshold, whether the detected traffic flow rate exceeds the traffic flow rate threshold, or both.

15. The system of claim 14 wherein:
the instructions to detect the one or more ambient conditions further comprise instructions to determine a posted speed limit at the DSL; and the instructions to calculate the traffic density threshold or traffic flow rate threshold comprise instructions to select as the percentage a value that is a function of the posted speed limit.

16. The system of claim 14 wherein:
the instructions to detect the one or more ambient conditions further comprise instructions to determine a number of lanes in the road at the DSL; and
the instructions to calculate the traffic density threshold or traffic flow rate threshold comprise instructions to select as the percentage a value that is a function of the number of lanes.

17. The system of claim 13, wherein:
the instructions to detect the one or more ambient conditions comprise instructions to, when one or more forward-facing sensors of the perception system detect an occlusion that is positioned between a current location of the AV in a road and the DSL:
  determine a visibility location at which the occlusion does not block a field of view from the AV to the DSL, and
  determine a distance from the visibility location to the DSL; and
the instructions to apply the stopping rule to the ambient conditions to determine whether the stopping rule permits the AV to stop at the DSL comprise instructions to determine whether a vehicle traveling along the road at a posted speed limit of the road can stop within the distance without exceeding a deceleration level threshold.

18. The system of claim 13, wherein:
the instructions to detect the one or more ambient conditions comprise instructions to, when the perception system detects that a person who is walking or cycling is positioned near the DSL, determine a distance from the person to the DSL and a trajectory of the person; and
the instructions to apply the stopping rule to the ambient conditions to determine whether the stopping rule permits the AV to stop at the DSL comprises instructions to determine whether the distance and trajectory indicate that the person will reach the DSL or a threshold distance from the DSL before the AV will reach the DSL according to a current trajectory of the vehicle.

19. The system of claim 13, wherein:
the instructions to detect the one or more ambient conditions comprises instructions to use the perception system to detect characteristics of a ground area at the DSL; and
the instructions to apply the stopping rule to the ambient conditions to determine whether the stopping rule permits the AV to stop at the DSL comprise instructions to assess whether the characteristics of the ground area indicate that none of one or more ground hazards are present in the ground area.

20. The system of claim 13 wherein:
the instructions to detect the one or more ambient conditions comprise instructions to determine a cost that moving the AV to the DSL would impose on another actor that is proximate to the vehicle; and
the instructions to apply the stopping rule to the ambient conditions to determine whether the stopping rule permits the AV to stop at the DSL comprise instructions to determine whether the cost will exceed a threshold.

21. The system of claim 13 wherein:
the instructions to detect the one or more ambient conditions comprise instructions to determine whether an obstacle that was not previously present has entered the DSL; and
the instructions to apply the stopping rule to the ambient conditions to determine whether the stopping rule permits the AV to stop at the DSL comprise instructions to, when an obstacle that was not previously present has entered the DSL, determine whether the selected obstacle will block the vehicle from accessing the DSL.

22. The system of claim 13 further comprising instructions to, upon determining that the stopping rule does not permit the AV to stop at the DSL:
  identify a plurality of candidate ASLs;
  for each of the candidate ASLs, determine a cost to the AV for stopping at the ASL;
  select, from the candidate ASLs, an ASL having the lowest determined cost; and
  cause the motion control system to move the AV to, and stop at, the selected ASL.

23. The system of claim 22 wherein the instructions to determine the cost to the AV for stopping at each of the candidate ASLs comprise instructions to, for each candidate ASL:
  determining a distance between the ASL and the DSL;
  assign a cost factor to the distance, wherein the cost factor increases with distance from the DSL; and
  determine the cost as a function of the cost factor.

24. The system of claim 13, wherein:
the instructions to apply the stopping rule to the one or more ambient conditions comprise instructions to apply a plurality of stopping rules to a plurality of ambient conditions to determine whether at least a threshold number of the stopping rules are satisfied by the ambient conditions at the DSL; and
the instruction to causes the motion control subsystem to move the AV to and stop at the DSL are configured to do so in response to at least the threshold number of the stopping rules being satisfied by the ambient conditions at the DSL.

* * * * *